United States Patent [19]

Hendricks

[11] 4,163,637
[45] Aug. 7, 1979

[54] METHOD AND APPARATUS FOR PRODUCING SMALL HOLLOW SPHERES

[75] Inventor: Charles D. Hendricks, Livermore, Calif.

[73] Assignee: The United States of America as represented by the United States Department of Energy, Washington, D.C.

[21] Appl. No.: 947,665

[22] Filed: Sep. 29, 1978

Related U.S. Application Data

[62] Division of Ser. No. 807,108, Jun. 16, 1977, Pat. No. 4,133,854.

[51] Int. Cl.² ............................................. B22D 11/01
[52] U.S. Cl. ........................................ 425/6; 425/174
[58] Field of Search .......... 425/6, 174, 174.2, 174.8 R

[56] References Cited

U.S. PATENT DOCUMENTS

| | | |
|---|---|---|
| 3,274,642 | 9/1966 | Cramer .............................. 425/174.2 |
| 3,347,798 | 10/1967 | Baer et al. ............................... 264/13 |
| 3,975,194 | 8/1976 | Farnaud et al. ......................... 264/13 |

*Primary Examiner*—Robert F. White
*Assistant Examiner*—James R. Hall
*Attorney, Agent, or Firm*—Dean E. Carlson; R. S. Gaither; L. E. Carnahan

[57] ABSTRACT

Method and apparatus for producing small hollow spheres of glass, metal or plastic, wherein the sphere material is mixed with or contains as part of the composition a blowing agent which decomposes at high temperature (T≧600° C.). As the temperature is quickly raised, the blowing agent decomposes and the resulting gas expands from within, thus forming a hollow sphere of controllable thickness. The thus produced hollow spheres (20 to $10^3$ μm) have a variety of application, and are particularly useful in the fabrication of targets for laser implosion such as neutron sources, laser fusion physics studies, and laser initiated fusion power plants.

5 Claims, 1 Drawing Figure

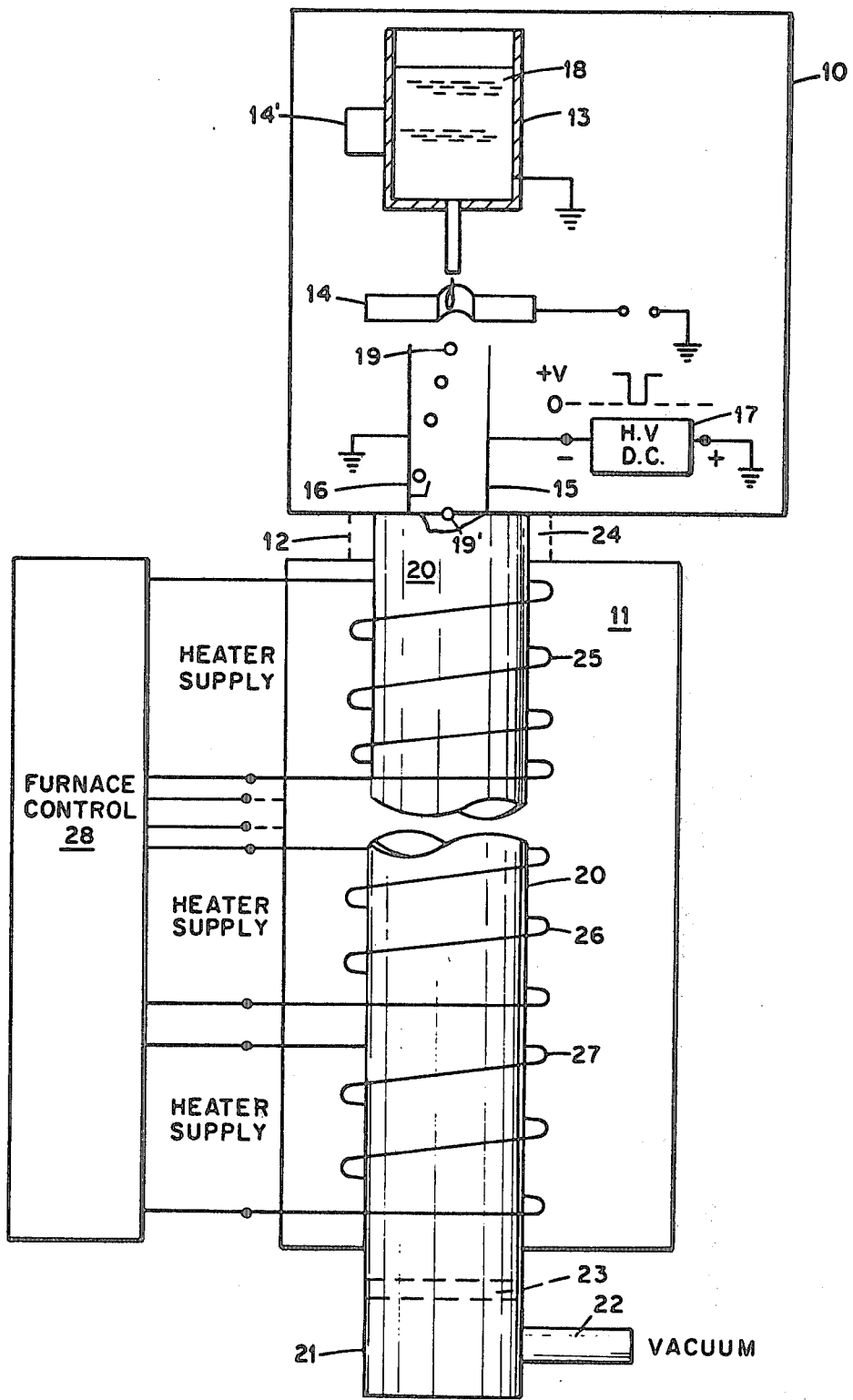

METHOD AND APPARATUS FOR PRODUCING SMALL HOLLOW SPHERES

BACKGROUND OF THE INVENTION

The invention described herein was made in the course of, or under, Contract No. W-7405-ENG-48 with the United States Energy Research and Development Administration.

This is a division of application Ser. No. 807,108, filed June 16, 1977, now U.S. Pat. No. 4,133,854.

This invention relates to the production of small hollow spheres, and particularly to a method and apparatus for producing small hollow spheres of uniform thickness and diameter.

The production of uniform particles or droplets has been the subject of research and development efforts for over a decade, as exemplified by an article by C. D. Hendricks et al, entitled "Production of Uniform Droplets by Means of an Ion Drag Pump", The Review of Scientific Instruments, Vol. 39, No. 8. 1088-1089, August 1968, and an article by C. D. Hendricks entitled, "Micron and Submicron Particle Production", IEEE Transactions on Industry Applications, Vol. 1A-10, No. 4, July/Aug. 1974.

This effort was substantially increased with the advances in laser energy sufficient to implode tiny targets for laboratory physics studies, or as small point neutron or x-ray sources, as exemplified by an article by I. Lewkowicz entitled "Spherical Hydrogen Targets For Laser-Produced Fusion", J. Phys. D: Appl. Phys., Vol. 7, 1974; an article by W. D. Friedman et al entitled "Target Fabrication and Positioning Techniques for Laser Fusion Experiments", Rev. Sci. Instrum., Vol. 45, No. 10, October 1974; U.S. Pat. No. 3,907,477 issued Sept. 23, 1975; and U.S. Pat. No. 3,985,841 issued Oct. 12, 1976.

Fabrication techniques for producing laser targets can be divided into a number of separate but overlapping tasks. These are: (1) selection of target materials composition; (2) parts manufacture; (3) fuel ball selection; (4) D-T filling of fuel balls; (5) characterization of all target parts including the fuel balls; and (6) target assembly.

Target components are either selected from commercially available supplies or manufactured as needed. The glass compositions used include sodalime, borosilicate, lead-phosphate, tungsten-phosphate, tantalum-borosilicate, lithium-borate, lead borosilicate, and several other less common formulations. Several plastics are used, including polyethylene, polymerized xylene, methacrylates, styrenes, various epoxy formulations and a number of deuterated hydrocarbon materials (commonly known as $CD_2$). A number of metals are also used in target fabrication, including gold, tungsten, stainless steel, nickel, platinum, copper, aluminum, brass molybdenum, indium, and beryllium. Also, targets of layer cryogenic materials such as deuterium-tritium, neon, xenon, etc. may be utilized. Target parts are fabricated by such diverse methods as sputtering, evaporative deposition, electro-and electroless plating, lapping, laser cutting, and photoetching. Various types of configurations of targets have been developed for laser, electron-beam, CTR, dense plasma focus, and other experiments, as exemplified by report UCRL-50021-75, entitled "Laser Program Annual Report—1975" by Lawrence Livermore Laboratory, University of California, pages 343-369.

One type of target currently utilized is the glass targets which utilize a tiny hollow glass sphere with a very thin, uniform wall. These microspheres are filled with a mixture of deuterium and tritium (DT) gas. More complicated targets are also fabricated, wherein one or more layers of selected materials surround the glass sphere, or the DT mixture is "frozen" within the sphere, in order to improve the efficiency of the implosion over that obtained with a simple ball-type target.

The hollow glass spheres, balls, or bubbles, commonly referred to as microspheres, which are used for fabricating targets have been produced in large quantities for commercial purposes such as low-mass epoxy fillers, and are usually irregularly shaped with walls of varying thickness, and are not uniform in weight or diameter. To obtain one microsphere with desired wall thickness, diameter, and specified sphericity, and wall uniformity, it has been necessary to sort through approximately $10^5$ of the microspheres which are delivered from the manufacturer. This long, laborious process involves many operations which include sieving, washing, optical microscopy, and interferometry, requiring many man-hours of effort.

Because of the expense of sorting the commercially made microspheres, efforts have been directed to development of methods and apparatus for microsphere production, optimized for the needs of target fabrication rather than high volume commercial uses. By producing microspheres of a specified mass and wall thickness the yield could possibly improve to at least one good microsphere out of ten, thus producing substantial cost savings. In addition to the need for effective methods and apparatus for producing the microspheres a need exists in the prior technology for capability of producing the microspheres whose composition can be adjusted to aid the implosion physics. In addition, the problems of contamination of the microspheres need be overcome.

SUMMARY OF THE INVENTION

The present invention provides a method and apparatus capable of producing microspheres of specified mass and wall thickness, the composition of which can be adjusted, while eliminating contamination and substantially reducing production costs, thus fulfilling the above-mentioned needs in this field. In addition, microspheres of glass, plastic, or metal can be fabricated by the present invention. By the present invention, selection of one good microsphere out of ten can be accomplished rather than one out of about $10^5$.

Therefore, it is an object of the invention to provide a method and apparatus for producing hollow spheres having a diameter of 20 to $10^3$ μm.

A further object of the invention is to provide a method and apparatus for producing small hollow spheres of uniform wall thickness and diameter.

Another object of the invention is to provide a method and apparatus for producing small hollow spheres of glass, plastic, or metal.

Another object of the invention is to provide a method and apparatus for producing microspheres of a specified mass and wall thickness.

Another object of the invention is to provide a method and apparatus for producing microspheres whose composition can be adjusted.

Other objects of the invention will become apparent to those skilled in the art from the following description and accompanying drawing.

BRIEF DESCRIPTION OF THE DRAWING

The single FIGURE is a schematic diagram of microsphere production apparatus in accordance with the invention.

DESCRIPTION OF THE INVENTION

The present invention is directed to a method and apparatus for producing microspheres of uniform wall thickness and diameter, whose composition can be adjusted, the microspheres being made of glass, metal or plastic. Broadly, and in accordance with the present invention the sphere material is mixed with or contains as part of the composition a blowing agent which decomposes at high temperatures. As the temperature is quickly raised, the blowing agent decomposes and the resulting gas expands from within, thus forming a hollow sphere of controllable thickness.

The apparatus of the invention broadly comprises a droplet generator which is mounted on top of a drying oven. The droplet generator forms uniformly sized drops, for example, of an aqueous solution of glass constituents and a blowing agent. These drops then fall into the oven where the water is removed, leaving a solid particle of the glass constituents. This solid particle then falls into a higher temperature zone of the oven where it is melted into a glass, and the blowing agent decomposes. The gas from the decomposition then blows the molten glass bubble into a microsphere of diameter ranging from 20 to $10^3$ μm and wall thickness of 0.25 to 30 μm.

While the following description is directed to the production of glass microspheres, the invention may be utilized to produce microspheres of plastic or metal, as described more generally hereinafter.

Referring now to the drawing, the apparatus broadly comprises a droplet generator 10 and a multizone drying oven 11 interconnected as indicated at 12, the oven shown having generally three zones.

The droplet generator 10 includes a reservoir with jet-forming orifice, generally indicated at 13, a charging electrode 14, a deflection electrode 15, a deflection electrode with catcher 16, and a power source or voltage supply 17 is connected to electrode 15, with electrode 16 connected to ground, as shown. The reservoir 13 contains a fluid solution 18 of glass forming components, including but not limited to sodium silicate and sodium borate, together with a thermally decomposable material such as urea. The solution 18 is forced through the jet-forming orifice of reservoir 13 to produce a liquid jet, as known in the art, and the droplet charge is controlled by charging electrode 14. A piezoelectric crystal 14' attached to a convenient part of the apparatus such as the reservoir 18, modulates the jet, which causes the jet to undergo "Raleigh breakup" and to form a stream of drops of predetermined uniform size indicated generally at 19. The jet modulating device may also be a magnetostructure device or an electroacoustic device, similar to a loud speaker or earphone, or by an applied a.c. or pulsed electric field on charging electrode 14 or on another electrode between charging electrode 14 and reservoir 18. Also, the pressure field acting on the jet or the jet direction may also be deliberately disturbed by pressure variation in the reservoir or connecting system. The charging electrode 14 places an electrical charge on the drops 19, and this electrical charge is determined by the voltage on the charge electrode or "charge ring" 14. The electrode charges the forming drops 19 by induction; if the charge ring has a positive voltage, a negative charge will be induced on the drops and vice versa. By selectively switching the charge-ring (charging electrode) voltage to either a positive voltage or ground, the drops 19 can be either charged negatively or left neutral. For example, one out of every thirty-two (32) drops is uncharged. The drops then pass between the deflection electrodes 15 and 16 where the charged and uncharged drops are separated. With the deflection electrode 15 carrying a negative potential, the negatively-charged drops 19 are repelled by the electrode 15 and strike the grounded electrode 16 where they are collected by the catcher on electrode 16 for recycling, via mechanism not shown, to the reservoir 13. The uncharged drops indicated at 19', pass through the deflection region (electrodes 15 and 16) unaffected and then pass through connecting means 12 into the oven 11. It is thus seen that most of the drops are caught by electrode catcher 16 while only the few uncharged drops go into the oven 11. Since most of the drops are caught, the space between the drops 19' which go into the oven is made large. By spacing the drops far apart while passing through the drying oven, the chance of a coalescing collision therebetween is minimized, and the resulting particle size is kept uniform.

The interconnecting mechanism 12 between droplet generator 10 and the oven 11 comprises a tube 20 which extends downwardly through oven 11 and may be connected to an removable elbow or other connector means 21 which constitutes a vent to house vacuum as indicated at 22. The lower tube 20 may be closed at collector 23 so that vacuum line 22 is not sealed. A particle collector 23 is positioned in the lower end of tube 20, while an air inlet 24 surrounds the upper portion of tube 20 intermediate oven 11 and generator 10, the air being supplied thereto by a source not shown and functions to move particles downwardly through the furnace. When tube 20 is closed at the bottom, no downflow of air is needed.

The oven 11 may have three sections or zones as indicated at 25, 26 and 27, with the temperature of each zone or section being controlled individually by oven temperature control 28. Since multiple zone ovens and controls therefore are well known in the art, further description thereof is believed unnecessary. For example, the mode of operation may be to set the top zone 25 to approximately 200° C., the middle zone 26 to 750° C., and the bottom zone to 1300° C. The drops 19', as they pass down tube 20 through oven 11 are dried in the top zone or section 25, and the particles (dried drops) are then fired into glass, by change of state, in the lower sections or zones as described in greater detail hereinafter. The thus formed glass particles are then collected by collector 23 as they fall out of the oven 11.

During the passage of the dried drops or particles through the zones or sections 26 and 27 of furnace 11 the glass forming components melt into a glassy material and the thermally decomposable material thereof chemically changes into gaseous components and these gases form a "bubble" in the glassy material. By suitably controlling the temperature profile through which the particle passes, the bubble of glass may be made to expand and acquire suitably thin and uniform walls and made to have a high degree of spherical symmetry.

Control of the size of the liquid drops from generator 10 and the concentration of the chemicals in the liquid allows control of the diameter and the wall thickness of the resulting glass spheres.

By way of example, to produce a hollow glass microsphere having a mass of 1.49 micrograms, a diameter of 200 μm and a uniform wall thickness of 5.0 μm, the method of the present invention would be carried out as follows:

1. The solution 18 would be composed of, for example, sodium silicate, potassium tetraborate, water and some urea. The weight percentage composition for the mix in terms of the glass forming oxides would be typically $SiO_2$:65.5
$Na_2O$:20.0
$B_2O_3$:6.5
$K_2O$:8.0

The correct composition for this example could be obtained by disolving 100 grams of sodium silicate ($Na_2O.4SiO_2$), 21.3 grams of potassium tetraborate ($K_2B_4O_7.8H_2O$), 5.2 grams of potassium hydro-oxide (KOH) and 4.9 grams of sodium hydroxide in water ($H_2O$) to make 1 liter of solution. Other glass compositions can be formed and will suggest themselves to one skilled in the art.

2. The thus composed solution 18 is placed in reservoir 12 with the jet-forming orifice having a diameter of approximately 150 μm, and the solution is forced through the orifice by a pressure of 3-6 psig so as to generate 7500 drops per second having a diameter of 286 μm.

3. The charging ring or electrode 14 has an opening or center having a diameter of about 2-4 mm and is selectively switched between a positive voltage of a few hundred volts (300-500 volts) and 0 to place a negative charge of a few-thousand pico-coulombs or no charge on the drops. To produce one uncharged drop out of every 32 drops the positive voltage would be switched off every 0.00427 second for a period of 75-100 microseconds.

4. The voltage source 17 connected to deflection electrode 15 produces a negative potential on electrode 15 such that the negatively-charged drops 19 are repelled toward and caught by the catcher of electrode 16 which is electrically connected to ground.

5. The uncharged drops 19′ pass into tube 20 and through oven 11, onto particle collector 23.

6. With a drop 19′ having a diameter of about 286 μm, and with zone 25 of oven 11 having a temperature of 300° C., the drop is partially dried in about 0.2 seconds.

7. As the thus dried drop passes through zone 26 of oven 11 the drop drying becomes more complete and the components of the particles begin to fuse into a glass-like material.

8. As the thus processed drop or particle passes through zone 27 of oven 11 the water of hydration of the materials vaporizes, expands and blows a "bubble" in the glass. If urea is present, it decomposes and the gaseous decomposition products expand and blow the bubble of glass forming a hollow spherical shell.

9. The thus formed glass microsphere is collected by particle collector 23 whereupon the size and wall thickness is checked for use in fabrication of a laser target or discarded if the spherical uniformity varies more than a few percent and the wall thickness varies more than a few percent.

The current commercial cost of, say 1 million small hollow glass spheres is of the order of $0.05. The laboratory cost of further processing these spheres to identify the few which are acceptable is $200–500/sphere and requires $25–50 K of equipment. By contrast, using the present invention $50 K worth of equipment (droplet generator and oven) will produce anywhere from 1% to 100% acceptable, uniform, small hollow glass spheres at an estimated cost of $0.0001/sphere. The spheres made by the present invention may be varied in wall thickness and/or diameter as well as the composition thereof. Further, it is estimated that as many as $10^3$–$10^5$ acceptable spheres per second may be produced using the present invention.

While the above description has been directed to the production of glass microspheres, plastic microspheres can be produced by using a solution of plastic, for example, a methacrylate in an appropriate solvent such as chloroform or other solvent; forming drops having a chosen diameter with an electrical charge sufficient for deflection and setting the temperature of oven zones 25, 26 and 27 to values appropriate to the solvents and plastic used.

To form metal microspheres using the present invention, the material would consist of the metal desired and a blowing agent, the reservoir would be heated to cause the metal to be molten and metal drops would be formed as described. A suitable decomposable blowing agent would be added to the metal, such agent to decompose to a gas on further heating of the molten metal, giving rise to a bubble in the molten drop, resulting in a hollow metal sphere upon cooling. For example, Woods Metal which melts at about 100° C. and urea as the blowing agent.

It has been thus shown that the present invention provides a method and apparatus for producing small hollow spheres having uniform thickness and diameter, the spheres being produced at substantially less cost than the cost/sphere by prior known techniques, thereby greatly advancing the state of the art.

While particular embodiments and/or compositions have been illustrated or described, modifications and changes will become apparent to those skilled in the art, and it is intended to cover in the appended claims all such modifications and changes as come within the spirit and scope of the invention.

What I claim is:

1. An apparatus for producing small hollow spheres of uniform diameter and wall thickness comprising a droplet generator and a multiple zone oven interconnected such that certain of the drops formed by said droplet generator pass through said multiple zone oven wherein said drops are dried and formed into hollow spheres, said droplet generator inluding means for forming drops of sphere forming material which are directed along a flow path to said multiple zone oven, means for electrically charging at least part of the drops, and means for deflecting said charged drops from along said flow path whereby only uncharged drops are directed into said oven; said multiple zone oven having means for controlling the temperature in each zone thereof such that each subsequent zone is of a high temperature.

2. The apparatus defined in claim 1, wherein said drop forming means comprises a reservoir with a jet-forming orifice, wherein said electrically charging means comprises a ring- or tube-shaped electrode through which drops pass, and wherein said deflecting means includes an electrode having a charge thereon which is electrically the same as the charge on the drops whereby the charged drops are repelled by the charged electrode.

3. The apparatus defined in claim 2, wherein said deflecting means includes a second electrode having an electrical charge thereon different from that on said first electrode of said deflecting means and having a means for catching drops deflected by said first electrode.

4. The apparatus defined in claim 1, wherein said multiple zone oven comprises three separately controlled temperature zones through which the drops from said droplet generator pass.

5. The apparatus defined in claim 1, additionally including means for collecting formed hollow spheres which have passed through said oven.

* * * * *